United States Patent
Gallagher et al.

(10) Patent No.: US 11,101,526 B2
(45) Date of Patent: Aug. 24, 2021

(54) SOLID ELECTROLYTE-LIQUID ELECTROLYTE HYBRID CELL

(71) Applicant: Robert Bosch GmbH, Stuttgart (DE)

(72) Inventors: Kevin Gregory Gallagher, Dachau (DE); John F. Christensen, Elk Grove, CA (US); Nathan P. Craig, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 16/253,411

(22) Filed: Jan. 22, 2019

(65) Prior Publication Data
US 2019/0229320 A1    Jul. 25, 2019

(30) Foreign Application Priority Data
Jan. 23, 2018 (DE) .......................... 102018200973.2

(51) Int. Cl.
*H01M 50/46* (2021.01)
*H01M 10/0568* (2010.01)
(Continued)

(52) U.S. Cl.
CPC ........... *H01M 50/46* (2021.01); *H01M 4/131* (2013.01); *H01M 4/5825* (2013.01);
(Continued)

(58) Field of Classification Search
CPC .. H01M 2/1653; H01M 2/1673; H01M 4/131; H01M 4/5825; H01M 10/052;
(Continued)

(56) References Cited

U.S. PATENT DOCUMENTS

| | | |
|---|---|---|
| 2004/0106037 A1 | 6/2004 | Cho et al. |
| 2009/0246636 A1 | 10/2009 | Chiang et al. |

(Continued)

FOREIGN PATENT DOCUMENTS

| | | |
|---|---|---|
| DE | 102011120959 A1 | 8/2012 |
| DE | 102014221046 A1 | 5/2016 |

(Continued)

OTHER PUBLICATIONS

Nguyen et al., "Promising applications of graphene an graphene-based nanostructures," Vietnam Academy of Science and Technology, Adv. Nat. Sci.: Nanosci. Nanotechnol. 7 (2016), 15 pp.*

(Continued)

*Primary Examiner* — Brittany L Raymond
(74) *Attorney, Agent, or Firm* — Norton Rose Fulbright US LLP; Gerard Messina

(57) ABSTRACT

A lithium cell, in particular a lithium-metal and/or lithium-ion solid electrolyte-liquid electrolyte hybrid cell, is described that includes an anode layer and a cathode layer. A separator layer is situated between the anode layer and the cathode layer. The cathode layer and/or the separator layer and/or the anode layer includes at least one solvent and/or at least one lithium conductive salt. To improve the rapid charge capacity of the cell, a dividing layer is situated between the cathode layer and the separator layer, which dividing layer is conductive for lithium ions and is impermeable for the at least one solvent of the cathode layer and/or of the separator layer and/or of the anode layer, and/or is impermeable for lithium conductive salt anions of the at least one lithium conductive salt of the cathode layer and/or of the separator layer and/or of the anode layer.

28 Claims, 2 Drawing Sheets

(51) Int. Cl.
  *H01M 4/131* (2010.01)
  *H01M 10/0569* (2010.01)
  *H01M 10/0565* (2010.01)
  *H01M 4/58* (2010.01)
  *H01M 10/052* (2010.01)
  *H01M 10/0566* (2010.01)
  *H01M 12/08* (2006.01)
  *H01M 50/411* (2021.01)

(52) U.S. Cl.
  CPC ..... *H01M 10/052* (2013.01); *H01M 10/0565* (2013.01); *H01M 10/0566* (2013.01); *H01M 10/0568* (2013.01); *H01M 10/0569* (2013.01); *H01M 12/08* (2013.01); *H01M 50/411* (2021.01); *H01M 2300/0068* (2013.01); *H01M 2300/0082* (2013.01); *H01M 2300/0088* (2013.01); *H01M 2300/0094* (2013.01)

(58) Field of Classification Search
  CPC ......... H01M 10/0565; H01M 10/0566; H01M 10/0568; H01M 10/0569; H01M 12/08; H01M 2300/0068; H01M 2300/0082; H01M 2300/0088; H01M 2300/0094
  See application file for complete search history.

(56) References Cited

U.S. PATENT DOCUMENTS

| | | |
|---|---|---|
| 2011/0223487 A1 | 9/2011 | Johnson et al. |
| 2016/0028114 A1* | 1/2016 | Pratt ................. H01M 4/62 |
| | | 429/309 |
| 2016/0072153 A1 | 3/2016 | Ichikawa et al. |
| 2016/0141620 A1 | 5/2016 | Cairns et al. |
| 2017/0005364 A1* | 1/2017 | Yamazaki ............ H01M 10/02 |
| 2019/0181495 A1* | 6/2019 | Tani .................... H01M 10/058 |

FOREIGN PATENT DOCUMENTS

WO        2015/088451 A1    6/2015
WO    WO 2018-025469    *   2/2018

OTHER PUBLICATIONS

Ji Won Suk, et al. "Mechanical Properties of Monolayer Graphene Oxide", ACS Nano, 2010, 4 (11), pp. 6557-6564.

Matthew Daly, et al., "Interfacial Shear Strength of Multilayer Graphene Oxide Films", ACS Nano, 2016, 10 (2), pp. 1939-1947.

* cited by examiner

SOLID ELECTROLYTE-LIQUID ELECTROLYTE HYBRID CELL

CROSS REFERENCE

The present application claims the benefit under 35 U.S.C. § 119 of German Patent Application No. DE 102018200973.2 filed on Jan. 23, 2018, which is expressly incorporated herein by reference in its entirety.

FIELD

The present invention relates to a lithium cell, in particular a lithium-metal and/or lithium-ion solid electrolyte-liquid electrolyte hybrid cell.

BACKGROUND INFORMATION

Lithium cells are of particular interest as energy storage units of the future.

Lithium-ion cells have at least one electrode layer that includes a lithium intercalation material and/or lithium insertion material. When the cell is charged and discharged, lithium ions can become embedded in the lithium intercalation material and/or lithium insertion material, and then dislodged again. In conventional graphite-based lithium-ion cells, the anode layer includes graphite as lithium intercalation material. Generally, in lithium-ion cells in particular the cathode layer also has a lithium intercalation material and/or lithium insertion material.

Lithium cells whose anode layer includes lithium metal and/or a lithium metal alloy are referred to as lithium-metal cells.

In lithium-sulfur cells, in contrast to lithium-ion cells, the electrochemical reaction of the cell at the cathode side is not based on an intercalation and/or insertion reaction into a lithium intercalation and/or lithium insertion material, but rather is based on a chemical conversion of sulfur (conversion reaction).

Lithium-sulfur cells are described in PCT Application No. WO 2015/088451 A1 and in U.S. Patent Application Publication No. 2016/0141620 A1.

SUMMARY

The present invention is directed to a lithium cell, for example a lithium-metal cell and/or lithium-ion cell, in particular a lithium-metal cell that includes an anode layer and a cathode layer. In accordance with the present invention, a separator layer is situated between the anode layer and the cathode layer.

The cathode layer and/or the separator layer and/or the anode layer includes for example at least one solvent, in particular an organic solvent, and/or at least one lithium conductive salt.

A dividing layer is in particular situated between the cathode layer and the separator layer. The dividing layer is in particular conductive for lithium ions and is impermeable for the at least one solvent of the cathode layer and/or of the separator layer and/or of the anode layer and/or is impermeable for lithium conductive salt anions of the at least one lithium conductive salt of the cathode layer and/or of the separator layer and/or of the anode layer.

The dividing layer can in particular be impermeable for the solvent, for example organic solvent, that is used in the cell and/or for lithium conductive salt anions.

"Impermeable" can be understood in particular as meaning that the layer substantially prevents a transport of the at least one solvent and/or of lithium conductive salt anions of the at least one lithium conductive salt of the cathode layer and/or of the separator layer and/or the anode layer, for example of the solvent used in the cell and/or of lithium conductive salt anions, the prevention of the transport in particular being ≥90%, for example ≥99%, for example ≥99.9%, or even ≥99.99%, relative in particular to the sum of the solvent molecules that are present, or relative to the sum of the lithium conductive salt ions that are present.

Due to the fact that the dividing layer is impermeable for the at least one solvent and/or for lithium conductive salt anions of the at least one lithium conductive salt of the cathode layer and/or of the separator layer and/or of the anode layer, the cathode layer on the one hand and the separator layer and/or the anode layer on the other hand can advantageously be decoupled from one another. For example, through the use of such a dividing layer different electrolytes can be used in the cathode layer and in the separator layer and/or anode layer, or at the cathode side and at the separator side and/or at the anode side, for example a liquid electrolyte at the cathode side and a solid electrolyte, for example a polymer electrolyte, at the separator side and/or at the anode side, in particular at the separator side, and/or different lithium conductive salt anions can be used at the cathode side than at the separator side and/or anode side, in particular at the separator side. In this way, the electrolytes can be optimized corresponding to their respective environment, and in this way the overall performance of the cell can be optimized. For example, the rate capacity of the cell can be improved through the use of a cathode-side liquid electrolyte, for example made up of at least one solvent, in particular an organic solvent, and at least one lithium conductive salt, in combination with the dividing layer. In addition, due to the dividing layer concentration gradients can be minimized, and for example an undesirable lithium conductive salt enrichment can be prevented in a component of the cell, for example in the separator layer, which can also have an advantageous effect on the rate capacity and thus the rapid charge capacity of the cell.

Overall, in this way the rapid charge capacity of the cell can be improved by the dividing layer.

In an embodiment, the dividing layer has an overall selectivity for the transport of lithium ions ($Li^+$), in particular compared to a transport of other mobile species of the cell, such as other (mobile) cations, anions, and uncharged molecules such as solvent molecules, of ≥90%, in particular ≥99%, for example ≥99.9%, for example ≥99.99%, relative to the sum of the mole numbers of the mobile species present in the cell, in particular (mobile) cations (including lithium ions), (mobile) anions, and (mobile) uncharged molecules.

In particular, the dividing layer can have an overall selectivity for the transport of lithium ions ($Li^+$), in particular relative to a transport of other mobile species of the cell, such as other (mobile) cations, anions, and uncharged molecules such as solvent molecules, of ≥99%, relative to the sum of mole numbers of the mobile species present in the cell, in particular (mobile) cations (including lithium ions), (mobile) anions, and (mobile) uncharged molecules. Through a lithium ion selectivity of 99%, concentration gradients between the separator and the cathode layer can advantageously be minimized, which can have an advantageous effect on the rate capacity of the cell.

For example, the dividing layer can have an overall selectivity for the transport of lithium ions ($Li^+$), in particular relative to a transport of other mobile species of the cell such as other (mobile) cations, anions, and uncharged molecules such as solvent molecules, of ≥99.9%, for example ≥99.99%, relative to the sum of the mole numbers of the mobile species present in the cell, in particular (mobile) cations (including lithium ions), (mobile) anions, and (mobile) uncharged molecules. This can be advantageous in particular for the use of different lithium conductive salts and/or solvents on both sides of the dividing layer, in particular in order to optimize the performance of the cell.

In the present context, "species" can be understood in particular as atoms and molecules.

With regard to a transport of electrons, where elementary particles are involved, the dividing layer can in principle be both electrically insulating and electrically conductive, because an electrical insulation between the anode layer and the cathode layer can be ensured by the separator layer, which in particular can be electrically insulating.

In a specific embodiment, the dividing layer includes modified graphene and/or graphene oxide, in particular cross-linked graphene oxide, and or lithium phosphorus oxynitride (LiPON).

In a realization of this specific embodiment, the dividing layer includes graphene and/or graphene oxide, for example modified graphene and/or graphene oxide, in particular cross-linked graphene oxide.

Graphene-based and/or graphene oxide-based dividing layers can advantageously have a laminar layer structure in which the layer spacing between the individual layers of the layer structure can, through a suitable modification, be set to be small enough that lithium ions can still be transported through, but no solvent molecules and/or lithium conductive salt anions can be transported through the dividing layer.

Graphene and/or graphene oxide, in particular modified graphene oxide, can be compatible with most materials used in cathode layers and separator layers. Due to the fact that the dividing layer is situated between the separator layer and the cathode layer, or due to the fact that the separator layer is situated between the anode layer and the dividing layer, in addition a reduction of in particular modified graphene oxide by metallic lithium of the anode layer can be avoided.

In addition, graphene-based and/or graphene oxide-based layers can have advantageous physical properties, and can for example be flexible and/or can have a high shear modulus, which can have an advantageous effect on their handling during the manufacture of the cell, and in particular also on the operational safety of the cell. Physical properties of graphene oxide are described for example in ACS Nano 2016, 10, pp. 1939-1947, and ACS Nano, 2010, vol. 4, no. 11, pp. 6557-6564.

In another, alternative or additional, realization of this specific embodiment of the present invention, the dividing layer includes lithium phosphorus oxynitride (LiPON). Lithium phosphorus oxynitride can advantageously be realized in the form of a sealed layer that conducts only lithium ions, and in particular is impermeable to solvent and impermeable to lithium conductive salt anions.

In a further specific embodiment of the present invention, the dividing layer has a layer structure made up of a multiplicity of graphene layers. Here, in particular adjacent graphene layers can be cross-linked among one another, for example via di- or poly-carboxylic acids or esters, and/or can have an average spacing from one another in the Angstrom range, in particular ≥15 Å, for example in a range of from ≥5 Å to ≥15 Å, for example approximately 7 Å or 8 Å.

Through such a small spacing between adjacent layers of the layer structure of the dividing layer, on the one hand a permeability of the dividing layer for lithium ions, and thus a lithium ion conductivity of the dividing layer, can advantageously be realized, and on the other hand an impermeability of the dividing layer for solvents, in particular those used in the cell, and/or for lithium conductive salt anions can advantageously be realized.

Through the cross-linking of the adjacent graphene layers, advantageously the layer structure, and in particular also the average spacing between the layers, can be fixed or protected from being changed. The average spacing between the layers can in addition advantageously be set through the selection of the cross-linking agent, for example with regard to the chain length of a cross-linking formed thereby.

In a further specific embodiment, the dividing layer includes at least one lithium conductive salt. Here, the at least one lithium conductive salt can in particular be intercalated between graphene layers. Through the cross-liking of the graphene layers, the lithium conductive salt anions of the intercalated lithium conductive salt can advantageously be held between the graphene layers in the dividing layer, so that only the lithium (cat)ions remain mobile, and as a result the dividing layer as a whole is conductive for lithium ions and impermeable for lithium conductive salt anions.

In particular, the blocking layer can therefore include, or be formed from, a graphene-based and/or graphene oxide-based layer structure having graphene layers cross-linked among one another and having at least one lithium conductive salt intercalated between the graphene layers.

Such a dividing layer can for example be produced through functionalization of graphene oxide with at least one cross-linking agent, for example acryloyl chloride, filtering off if warranted of the functionalized graphene oxide, introduction of at least one lithium conductive salt, for example lithium bis(trifluormethanesulfonyl)imide (LiTFSI), into the functionalized graphene oxide, drying if warranted, for example vacuum drying, of the functionalized graphene oxide having the at least one introduced lithium conductive salt, and cross-linking, for example radiation-induced, for example induced by ultraviolet radiation, of the at least one cross-linking agent. In this way, in particular the graphene layers having lithium conductive salt intercalated between them can be cross-linked with one another. Such a production of cross-linked graphene oxide was described by K. R. Zavadil, K. C. Klavetter, B. Helms, X. Meng, and J. Elam during the MRS Fall Meeting 2016.

In a further specific embodiment, the dividing layer has an average layer thickness (d) of ≤1 µm, in particular ≤0.5 µm. Such thin layers can advantageously already be adequate to achieve the described effect. In this way, a specific energy density, and thus performance, of the cell that is as high as possible can be achieved.

The separator layer can include in particular at least one solid electrolyte, for example at least one polymer electrolyte.

In a further specific embodiment, the separator layer includes at least one block copolymer that is conductive for lithium ions.

In addition, the separator layer can include in particular at least one lithium conductive salt.

For example, the separator layer can include, or be made up of, at least one polymer electrolyte, in particular at least one block copolymer that is conductive for lithium ions and at least one lithium conductive salt.

The at least one block copolymer conductive for lithium ions can for example include or be a block copolymer of at least one polymer conductive for lithium ions, for example polyethylene oxide, and at least one mechanically stabilizing polymer, for example polystyrene and/or polyacrylate, for example at least one polyethylene oxide-polystyrene block copolymer and/or at least one polyethylene oxide polyacrylate block copolymer. For example, the separator layer can be a separator layer known under the trade name DryLyte.

The separator layer can in particular have a larger average layer thickness than the dividing layer.

In a further specific embodiment, the separator layer has an average layer thickness (D) in a range of from ≥0.5 μm to ≤50 μm. In this way, on the one hand a good electrical insulation can advantageously be achieved between the anode layer and the cathode layer, and on the other hand a specific energy density, and thus performance, of the cell that is as high as possible can nonetheless advantageously be achieved.

In a further specific embodiment of the present invention, the cathode layer and/or the separator layer and/or the anode layer, for example the cathode layer and the separator layer and/or anode layer, in particular the cathode layer and the separator layer, have lithium conductive salts that are different from one another. In this way, the lithium conductive salts can be optimized in accordance with their respective environment, and in this way the overall performance of the cell can be optimized.

In a realization of this specific embodiment, the cathode layer includes at least one lithium conductive salt that releases fluoride ions, for example at least one lithium conductive salt that is boron-based and/or phosphorus-based and contains fluoride, for example lithium tetrafluoroborate ($BF_4$) and/or lithium hexafluorophosphate ($LiPF_6$).

In lithium conductive salts that release fluoride ions, such as lithium tetrafluoroborate ($BF_4$), having the chemical equilibrium: $BF_4 \leftrightarrow BF_4 + F^-$ and/or lithium hexafluorophosphate ($LiPF_6$), having the chemical equilibrium $PF_6 \leftrightarrow PF_5 + F^-$, advantageously the released fluoride ions ($F^-$) can form a passivation layer on a cathode current collector, for example made of aluminum. A passivation of the cathode current collector can in turn have an advantageous effect on an operation of the cell at increased temperatures. Therefore, lithium conductive salts that release fluoride ions can be used particularly advantageously at the cathode side. In contrast, given an anode layer that includes lithium metal and/or a lithium metal alloy, fluoride ions ($F^-$) can cause a high boundary surface impedance. Therefore, the separator layer, in particular given an anode layer that includes a lithium metal and/or a lithium metal alloy, is preferably free of lithium conductive salts that release fluoride ions. In this way, the cell internal resistance, and thus the performance of the cell, can be optimized.

In an alternative or additional realization of this specific embodiment, the separator layer includes lithium bis (trifluormethanesulfonyl) imide (LiTFSI). Lithium bis(trifluormethanesulfonyl)imide (LiTFSI) advantageously has a relatively stable $CF_3$ group. In this way, fluoride ions can be avoided at the anode side, and in this way the cell internal resistance, and thus the performance of the cell, can be optimized.

In a further specific embodiment of the present invention, the cathode layer and/or the separator layer and/or the anode layer, for example the cathode layer and the separator layer and/or the anode layer, in particular the cathode layer and the separator layer, have lithium conductive salt concentrations that differ from one another. In this way, the lithium conductive salt concentrations can be optimized corresponding to the respective environment, and in this way the overall performance of the cell can be optimized.

In a realization of this specific embodiment, the cathode layer has a higher lithium conductive salt concentration than the separator layer and/or the anode layer, in particular than the separator layer. A higher lithium conductive salt concentration at the cathode side can have an advantageous effect with regard to suppression of corrosion and/or formation of a passivation layer on a cathode current collector, for example made of aluminum. For example, the cathode layer can have a high lithium conductive salt concentration, in particular >1 M. Properties of electrolytes having high lithium conductive salt concentrations are described in Energy Environ. Sci., 2014, 7, pp. 416-426.

In a further specific embodiment, the cathode layer and/or the separator layer and/or the anode layer, for example the cathode layer and the separator layer and or the anode layer, in particular the cathode layer and the separator layer, have polymer electrolytes differing from one another. Here, the polymer electrolyte of the cathode layer and of the separator layer and/or anode layer, in particular of the cathode layer and of the separator layer, can differ for example in their type, composition, and concentration. In this way, the polymer electrolytes can be optimized corresponding to their respective environment, and in this way the overall performance of the cell can be optimized. Here, advantageously the dividing layer can prevent the establishment of a thermodynamic equilibrium between the polymer electrolytes of the cathode layer and of the separator layer and/or anode layer, in particular of the cathode layer and the separator layer, and in this way different thermodynamic equilibrium constants can be realized at the different sides of the dividing layer.

The cathode layer can in particular include at least one liquid electrolyte, for example made of at least one solvent, in particular an organic solvent, and at least one lithium conductive salt.

In a further specific embodiment, the cathode layer contains solvent and the separator layer is free of solvent. In this way, an improved rate capacity of the cell can be achieved.

In another specific embodiment, the at least one solvent of the cathode layer and/or of the separator layer and/or of the anode layer, for example the at least one solvent of the cathode layer and of the separator layer and/or of the anode layer, in particular the at least one solvent of the cathode layer and of the separator layer, are different from one another. In this way, the solvents can be optimized corresponding to their respective environments, and in this way the overall performance of the cell can be optimized.

In a further specific embodiment, the anode layer includes lithium metal and/or a lithium metal alloy, or is formed therefrom. In this way, a high performance of the cell can be achieved.

In a further specific embodiment, the cathode layer includes at least one lithium intercalation material and/or lithium insertion material, for example at least one oxidic and/or phosphate-based cathode active material, for example at least one layer oxide and/or spinel and/or olivine. For example, the cathode layer can include at least one nickel-cobalt-aluminum oxide (NCA) and/or a lithium-manganese and/or -nickel- and/or cobalt oxide, for example at least one nickel-cobalt-aluminum oxide (NCA) and/or a lithium-manganese and/or -nickel- and/or cobalt layer oxide, for example $LiMO_2$ where M=manganese and/or nickel and/or cobalt, and/or at least one lithium-manganese and/or -nickel- and/or cobalt spinel, for example $LiMn_2O_4$ and/or $LiNi_{0.5}Mn_{1.5}O_4$ and/or $LiNi_{2-y}M'_yO_4$, for example where M'=nickel and/or cobalt, and/or at least one olivine, for example at least one lithium-iron and/or -manganese- and/or -nickel- and/or -cobalt phosphate, for example LiM″PO$_4$ where M″=iron and/or manganese and/or cobalt and/or nickel, such as LiFePO$_4$ and/or LiMnPO$_4$ and/or LiCoPO$_4$ and/or LiNiPO$_4$.

In a further specific embodiment, the cell is a solid electrolyte-liquid electrolyte hybrid cell.

The separator layer can in particular include, or be made up of, at least one solid electrolyte, for example at least one polymer electrolyte, for example at least one block copolymer that is conductive for lithium ions and at least one lithium conductive salt. In particular, the separator layer can contain solid electrolyte, in particular can contain polymer electrolyte, and/or (if warranted) can be free of solvent.

The cathode layer can in particular include at least one liquid electrolyte, for example made up of at least one solvent, in particular an organic solvent, and at least one lithium conductive salt. In particular, the cathode layer can contain liquid electrolyte and/or can contain solvent.

The anode layer can in particular include lithium metal and/or a lithium metal alloy. In particular, the anode layer can be made up of lithium metal and/or a lithium metal alloy, and/or can be free of solvent.

The cell can in particular be a lithium-metal cell and/or a lithium-ion solid electrolyte-liquid electrolyte hybrid cell.

BRIEF DESCRIPTION OF THE DRAWINGS

Further advantages and advantageous embodiments of the subject matter of the present invention are illustrated in the figures and are explained below. It is to be kept in mind that the figures have only a descriptive character and are not intended to limit the present invention in any way.

DETAILED DESCRIPTION OF EXAMPLE EMBODIMENTS

Figure 1:
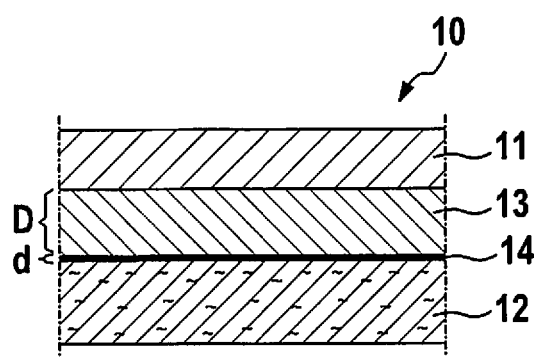
FIG. 1 shows a schematic cross-section through a specific embodiment of a lithium cell according to the present invention.

FIG. 1 shows that lithium cell 10 includes an anode layer 11 and a cathode layer 12. A separator layer 13 is situated between anode layer 11 and cathode layer 12. Cathode layer 12 and/or separator layer 13 and/or anode layer 11 can include at least one solvent, in particular an organic solvent, and/or at least one lithium conductive salt.

A dividing layer 14 is situated between cathode layer 12 and separator layer 13, which is conductive for lithium ions and is impermeable for the at least one solvent of cathode layer 12 and/or of separator layer 13 and/or of anode layer 11 and/or is impermeable for lithium conductive salt anions of the at least one lithium conductive salt of cathode layer 12 and/or of separator layer 13 and/or of anode layer 11.

Anode layer 11 can in particular include lithium metal and/or a lithium metal alloy or can be formed therefrom.

Cathode layer 12 can for example include at least one lithium intercalation material and/or lithium insertion material, in particular a nickel-cobalt-aluminum oxide and/or a lithium-manganese and/or -nickel- and/or cobalt oxide and/or a lithium-iron and/or -manganese- and/or -nickel- and/or -cobalt phosphate.

In particular, the cell can be a lithium-metal cell and a lithium-ion cell.

Separator layer 13 can for example include at least one solid electrolyte, in particular at least one polymer electrolyte, for example made up of at least one block copolymer conductive for lithium ions, for example a polyethylene oxide-polystyrene block copolymer and/or polyethylene oxide-polyacrylate block copolymer, and at least one lithium conductive salt.

Dividing layer 12 can in particular have a selectivity for the transport of lithium ions Li$^+$ of ≥90%, for example ≥99%, for example ≥99.9%, or even ≥99.99%, relative to the sum of the mole numbers of the mobile species present in the cell.

For example, dividing layer 14 can have an average layer thickness d of ≤1 μm, in particular ≤0.5 μm, and can include graphene and/or graphene oxide, in particular cross-linked graphene oxide. Separator layer 13 can in particular have an average layer thickness D that is larger than the average layer thickness d of dividing layer 14. For example, separator layer 13 can have an average layer thickness (D) in a range of from ≤0.5 μm to ≤50 μm.

Figure 2:
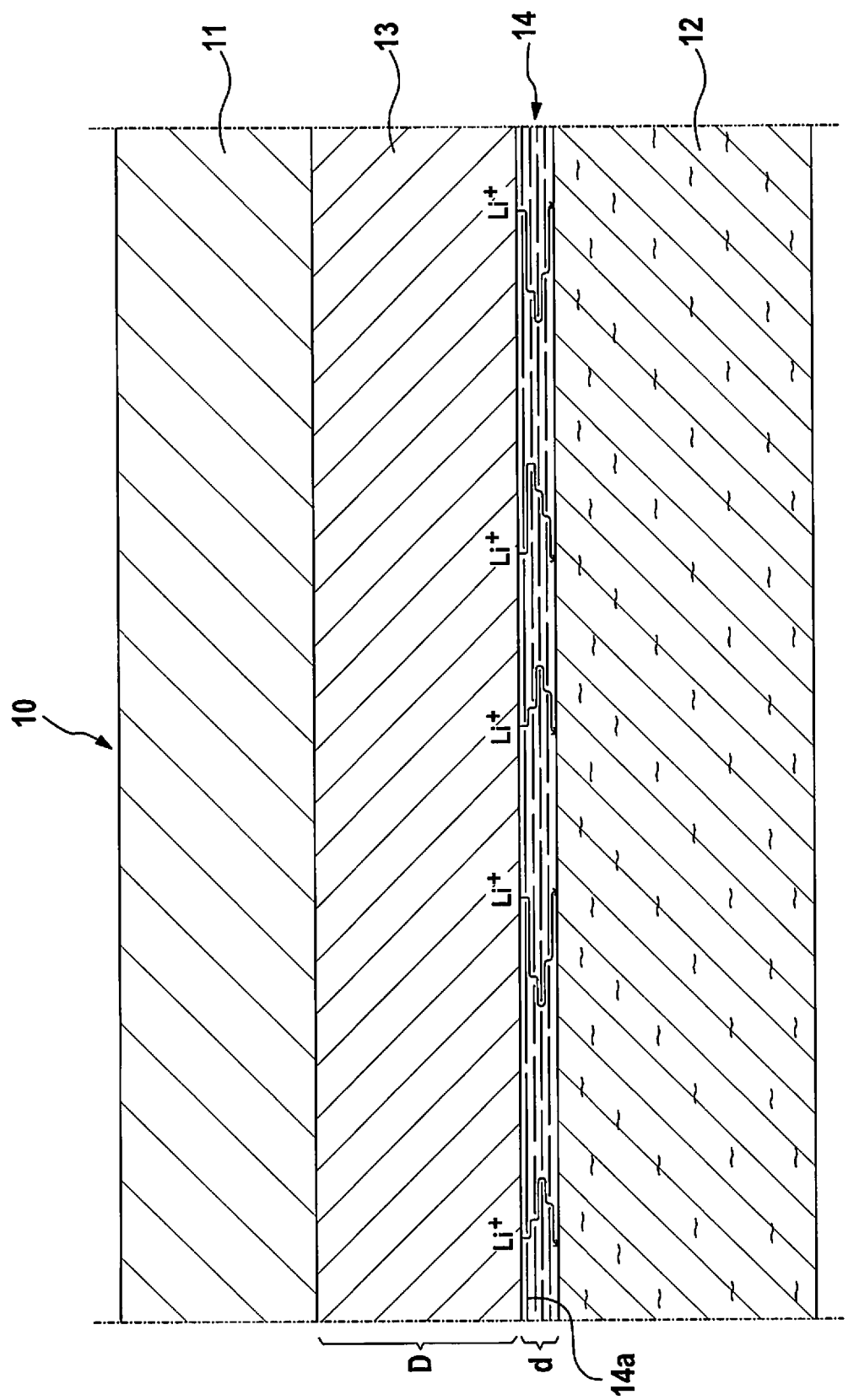
FIG. 2 shows an enlarged schematic cross-section through the specific embodiment of FIG. 1 of a cell according to the present invention.

FIG. 2 illustrates that dividing layer 14 can have a layer structure of a multiplicity of graphene layers 14a, for example having an extension in the micrometer range, for example approximately 10 μm. Adjacent graphene layers 14a can be cross-linked among one another, for example via di- or poly-carboxylic acids or esters. Here the graphene layers 14a can have an average spacing from one another in the Angstrom range, in particular ≤15 Å, for example in a range of from ≤5 Å to ≤15 Å, for example approximately 7 Å or 8 Å. A lithium conductive salt can in particular be intercalated between graphene layers 14a. Through the cross-linking of graphene layers 14a, advantageously the lithium conductive salt anions of the intercalated lithium conductive salt can be held fast between graphene layers 14a in dividing layer 14, so that only the lithium (cat)ions remain mobile, and as a result the dividing layer as a whole is conductive for lithium ions and impermeable for lithium conductive salt anions.

The fact that dividing layer 14 is conductive for lithium ions and is impermeable for solvent and/or for lithium conductive salt anions of the cell makes it possible that cathode layer 12 and separator layer 13 can include lithium conductive salts differing from one another, and/or lithium conductive salt concentrations differing from one another, and/or solvents differing from one another, and/or electrolytes differing from one another, for example polymer electrolytes or liquid electrolytes differing from one another, or on the one hand a liquid electrolyte and on the other hand a polymer electrolyte.

For example, cathode layer 12 can include at least one liquid electrolyte, in particular made up of at least one solvent and at least one lithium conductive salt, and can thus contain solvent. Separator layer 13 can for example include at least one polymer electrolyte, in particular made up of at least one block copolymer conductive for lithium ions, and at least one lithium conductive salt, and (if warranted) can be free of solvent. In particular, cell 10 can in this way be realized as a solid electrolyte-liquid electrolyte hybrid cell that has a cathode layer 12 containing liquid electrolyte and/or containing solvent, and has a separator layer 13 containing solid electrolyte and/or (if warranted) not containing solvent.

What is claimed is:
1. A lithium cell, comprising:
an anode layer;
a cathode layer;
a separator layer situated between the anode layer and the cathode layer, wherein at least one of the cathode layer, the separator layer, and the anode layer includes at least one solvent and/or at least one lithium conductive salt; and a dividing layer situated between the cathode layer and the separator layer, the dividing layer being conductive for lithium ions and being impermeable for: (i) the at least one solvent and/or (ii) lithium conductive salt anions of the at least one lithium conductive salt;

wherein the dividing layer includes a plurality of sub-dividing-layers (1) that are cross-linked to one another and/or (2) between which a lithium conductive salt that is separate from the plurality of sub-dividing-layers is intercalated.

2. The lithium cell as recited in claim 1, wherein the lithium cell is a lithium-metal cell and/or a lithium-ion cell.

3. The lithium cell as recited in claim 1, wherein the dividing layer has an overall selectivity for transport of lithium ions ($Li^+$) of ≥90% relative to a sum of mole numbers of a mobile species present in the cell.

4. The lithium cell as recited in claim 1, wherein the dividing layer has an overall selectivity for transport of lithium ions ($Li^+$) of ≥99%, relative to a sum of mole numbers of a mobile species present in the cell.

5. The lithium cell as recited in claim 1, wherein the dividing layer includes graphene and/or graphene oxide.

6. The lithium cell as recited in claim 1, wherein the dividing layer includes cross-linked graphene oxide, and/or lithium phosphorus oxynitride.

7. The lithium cell as recited in claim 1, wherein the plurality of sub-dividing-layers are graphene layers, adjacent ones of the graphene layers being cross-linked among one another and/or have an average spacing from one another in a range of ≤15 Å.

8. The lithium cell as recited in claim 1, wherein the dividing layer includes at least one lithium conductive salt, the at least one lithium conductive salt being intercalated between graphene layers.

9. The lithium cell as recited in claim 1, wherein the dividing layer has an average layer thickness of ≤1 μm, and/or the separator layer has an average layer thickness in a range of from ≥0.5 μm to ≤50 μm.

10. The lithium cell as recited in claim 1, wherein the dividing layer has an average layer thickness of ≤0.5 μm, and/or the separator layer has an average layer thickness in a range of from ≥0.5 μm to ≤50 μm.

11. The lithium cell as recited in claim 1, wherein the separator layer includes at least one block copolymer conductive for lithium ions, and at least one lithium conductive salt.

12. The lithium cell as recited in claim 1, wherein the separator layer includes at least one polyethylene oxide-polystyrene block copolymer and/or at least one polyethylene oxide-polyacrylate block copolymer, and includes at least one lithium conductive salt.

13. The lithium cell as recited in claim 1, wherein the cathode layer and the separator layer include lithium conductive salts differing from one another.

14. The lithium cell as recited in claim 13, wherein: (i) the cathode layer includes lithium tetrafluoroborate and/or lithium hexafluorophosphate, and/or (ii) the separator layer includes lithium bis(trifluormethanesulfonyl)imide.

15. The lithium cell as recited in claim 1, wherein the cathode layer and the separator layer having lithium conductive salt concentrations differing from one another, the cathode layer having a higher lithium conductive salt concentration than does the separator layer.

16. The lithium cell as recited in claim 1, wherein the cathode layer and the separator layer have polymer electrolytes differing from one another.

17. The lithium cell as recited in claim 1, wherein; (i) the cathode layer contains solvent and the separator layer is free of solvent, or (ii) the at least one solvent of the cathode layer and of the separator layer are different from one another.

18. The lithium cell as recited in claim 1, wherein the anode layer includes lithium metal and/or a lithium metal alloy.

19. The lithium cell as recited in claim 1, wherein the cathode layer includes at least one lithium intercalation material and/or lithium insertion material.

20. The lithium cell as recited in claim 19, wherein the cathode layer includes at least one of an oxide, a material that has a spinel structure, and a material that has an olivine structure.

21. The lithium cell as recited in claim 1, wherein the cell is a solid electrolyte-liquid electrolyte hybrid cell, the cathode layer includes at least one liquid electrolyte and/or solvent, and the separator layer includes at least one solid electrolyte, the solid electrolyte including at least one polymer electrolyte.

22. The lithium cell as recited in claim 21, wherein the cathode layer includes the at least one liquid electrolyte, and the at least one liquid electrolyte is made up of the solvent and at least one conductive salt.

23. The lithium cell as recited in claim 1, wherein the plurality of sub-dividing-layers are cross-linked to one another.

24. The lithium cell as recited in claim 1, wherein the lithium conductive salt is intercalated between the sub-dividing-layers.

25. The lithium cell as recited in claim 24, wherein the plurality of sub-dividing-layers are cross-linked to one another.

26. The lithium cell as recited in claim 24, wherein the lithium conductive salt that is intercalated between the sub-dividing-layers is trapped between the sub-dividing-layers by the cross-link of the sub-dividing-layers to one another.

27. The lithium cell as recited in claim 1, wherein the dividing layer is thinner than the separator layer.

28. The lithium cell as recited in claim 1, wherein an average spacing of the sub-dividing-layers from one another is ≤15 Å.

* * * * *